United States Patent Office 3,632,697
Patented Jan. 4, 1972

3,632,697
PRODUCTION OF DISPERSION HARDENED COPPER SHEET FROM METAL POWDERS BY ROLL COMPACTING
Walter L. Finlay, New York, N.Y., and Harbhajan S. Nayar, Maynard, and Donald A. Hay, Medfield, Mass., assignors to Copper Range Company, New York, N.Y.
Filed Sept. 5, 1967, Ser. No. 665,332
Int. Cl. G21c 21/10
U.S. Cl. 264—.5
16 Claims

ABSTRACT OF THE DISCLOSURE

Dispersoid strengthened copper metals characterized by a copper matrix and a refractory dispersoid are produced by roll compacting particles characterized by certain spatial and metallurgical relationships. The spatial considerations are characterized by practicable relationships in copper particles between surface area and overall dimensions. The metallurgical relationships are characterized by critical limits of dimensions and spacing of dispersoid subparticles or components thereof on or in the copper matrix particles either before or after roll compacting.

INTRODUCTION

The present invention relates to metallurgy and, more particularly, to the production of metallurgical compositions involving a continuous phase or matrix and a dispersed phase or dispersoid, by roll compacting copper particles of specified physical shape and specified composition distribution in order to achieve increased strength, particularly at elevated temperatures. In a typical "stable dispersoid strengthened" composite material, a relatively soft copper matrix provides at least the characteristic of high conductivity and a relatively hard refractory dispersoid provides at least the characteristic of increased strength. Of all available materials, copper generally offers the best combination of lowest production cost and highest electrical conductivity, with adequate strength and corrosion resistance. Moreover, its strength can be greatly increased by cold working with virtually negligible reduction in electrical conductivity. In practice, cold worked, commercially pure copper constitutes the optimum choice for electrical conductors requiring higher strength than that of annealed copper at room temperature. On the other hand, the strengthening effect of cold work is gradually lost on heating via atomic phenomena known as "recovery" and "recrystallization." In pure copper, these phenomena occur below the service temperatures and service times increasingly desired. As is well known, "stable dispersoid strengthening" involves a uniform distribution of very small particles throughout the metal matrix. These particles are "stable" in that they essentially are insoluble in the metal matrix and, hence, cannot reduce electrical conductivity by solid solution. But these particles are sufficiently small and numerous to block effectively the dislocation and the grain boundary motions that constitute recrystallization and softening of a cold worked metal. As a result, these particles retain desirable strain hardening of the matrix metal due to cold work (desirable because of strengthening plus minimal effect on electrical conductivity) from room temperature to temperature well above the recovery and recrystallization temperatures of pure copper. Generally, the tendency of dispersoid particles to increase strength and the avoidance by dispersoid particles of reducing conductivity are functions of dispersoid particles chemistry, size, shape, spacing and distribution. Stable dispersoid strengthening of the foregoing type has been achieved in various ways including fusion metallurgy by which the dispersoid particles are mixed into a matrix melt; powder metallurgy by which dispersoid particles and solid matrix particles are mixed and compacted; or/and by internal generation involving precipitation of dispersoid particles in a matrix melt by chemical reaction. The mixing of a dispersoid into a matrix melt by fusion metallurgy, the mixing of dispersoid particles and matrix particles by ordinary powder metallurgy and the precipitation of a dispersoid into a matrix melt by chemical reaction have limitations in that, oftentimes, specified conductivity and strength characteristics require particle sizes, distances, distributions and concentrations that may be difficult to achieve.

SUMMARY OF THE INVENTION

The primary object of the present invention is to produce dispersoid strengthened copper metal sheet by: conditioning copper particles that are characterized by irregular shape providing large surface area per solid volume and a refractory dispersoid or a component thereof distributed at the surface and/or in the solid, by which dispersoid strengthening may be effected; compacting a continuously flowing stream of the particles to provide a so-called "green" compact in sheet form; sintering the "green" compact at a temperature at which recrystallization and grain growth occur in order to increase interdiffusion between the particles and to reduce the volume of voids between the original particles; and conditioning the sintered sheet by chemical reaction with predetermined components within the sheet to form dispersoid sub-particles and/or to reduce the sheet to final thickness by working.

Pursuant to the foregoing object of the present invention, preferably, the particles have sufficiently irregular general surface configuration and sufficiently high specific surface area to result in an apparent particle density ranging from 2 to 5 grams per cubic centimeter and, for best results, an apparent particle density ranging from 3 to 5 grams per cubic centimeter. In various forms: the particles are aqueous or other suitable solution with a dentritic or rough crystalline-faceted surfaces; the particles are mechanically or metallurgically formed to a shape, e.g. acicular, particularly adapted to direct particle rolling; the particles are puffed so that their solid mass is in the form of a relatively thin shell enveloping a relatively large space; the particles are fissured so that their solid mass is characterized by a network of deep striae which provide relatively large surface area; or the particles are burst so that their solid mass is in the form of shaped petals, that are capable of interlocking, etc. In accordance with certain aspects of the present invention, any of these various types of particles may be fractured mechanically to provide smaller starting particles for direct rolling. The composition of the copper particles is conditioned by internal and/ or external reaction to provide a requisite combination of non-uniform configuration and refractory sub-particle distribution, as one example, internal reaction with hydrogen of a eutectic network of $Cu_2O$ sub-particles causes fissuring within the copper particle by which the desired irregular configuration is achieved. And, in another form of particle, reaction of an active metal such as aluminum (alloyed in solid solution with the copper) with a controlled supply of oxygen forms $Al_2O_3$ both at the particle surface where the resulting $Al_2O_3$ skin prevents the particle from assuming a spherical shape while still molten, and after solidification, within the particles where sub-particle formation occurs. Alternatively, the latter particle in which aluminum is alloyed with the copper, having had a non-uniform configuration provided before sub-particle formation, is continuously compacted first and is subjected to chemical reaction thereafter in order to form refractory sub-particles.

Pursuant to the foregoing object of the present invention the continuous consolidation is advantageous in that uninterrupted mechanical and chemical control of the system is possible and in that the initially consolidated product is close to final dimensions. As a result, simple and few operations are involved, with consequent savings in manufacturing cost and prevention of product non-uniformity.

Pursuant to the foregoing object of the present invention, the continuous flow of particles of the foregoing type occurs between compacting rolls at pressures ranging from 20,000 to 50,000 pounds per square inch and at temperatures ranging from room temperature to 900° F. The ambient atmosphere may be air but, for special products, it may be adavntageous to conduct the heating of the particles and their roll compacting in an inert, reducing or very low pressure (vacuum) atmosphere or environment. The large particle surface areas tend to enable the rolls to catch the particles effectively and to compact the particles and sub-particles into a substantially continuous strip having an initial density by volume of from 60 to 95% of the completely solid composite, i.e. voids of from 40 to 5% by total volume of the strip. Indeed, when employing acicular particles preheated up to 900° F., for roll compacting, densities of essentially 100% can be achieved. Sintering of this green sheet at temperatures ranging from 600 to 1500° F. results in a high strength solid product, in which the refractory sub-particles, e.g. the $Cu_2O_3$, serve a dispersoid strengthening function. Final working of the sintered product effects a reduction in thickness ranging from 50 to 90% in order to produce a final product with good surface quality and good dimensional uniformity. This final product ranges in density from 95 to 100% of its theoretical solid density preferably essentially 100% and ranges in thickness from .0015 to 0.150 inch.

Other objects of the present invention will in part be obvious and will in part appear hereinafter. The invention accordingly comprises the processes and products involving the several steps and the components and relationships thereamong, which are exemplified in the following detailed description, the scope of which will be indicated in the appended claims.

BRIEF DESCRIPTION OF THE DRAWING

For a fuller understanding of the nature and objects of the present invention, reference should be had to the following detailed description taken in connection with the accompanying drawing wherein.

DETAILED DESCRIPTION

Matrix and dispersoid relationships

Figure 1:
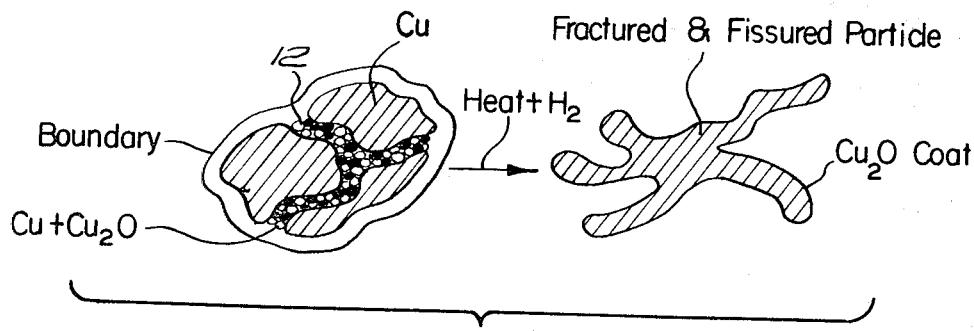
FIG. 1 illustrates, in exaggerated cross-section, details of the production of a particulate intermediate product in accordance with the present invention.

Generally, the matrix of the copper particles contains at least 50 percent copper so that copper is at least one of its characteristic ingredients. In the specific examples hereinbelow, the following three types of copper matrix are utilized. (1) Electrolytic Tough Pitch (ETP) copper which contains, by total weight in a remainder of copper: combined oxygen in the form of $Cu_2O$ and dissolved oxygen—0.04%; and nickel, iron, bismuth and arsenic—trace. (2) Lake Copper, which contains by total weight in a remainder of copper: from 0.04 to 0.89 percent silver, in addition to the minor proportions of oxygen, nickel, iron, bismuth and arsenic, as specified above in connection with ETP copper. (3) Oxygen Free (OF) copper typically containing by total weight, in addition to a remainder of copper, approximately: iron—0.0005%; sulfur—0.0025%; silver—0.0010%; nickel—0.0006%; tin—0.002%; arsenic—0.0003%; selenium—0.0002%; tellurium—0.0001%; lead — 0.0006%; antimony — 0.002%; manganese — 0.0005%; bismuth—0.0001%; and oxygen—0.0002%. When electrical conductivity is not a primary consideration, the matrix in various forms is composed of an alloy of copper.

Generally, as indicated above, the sub-particle dispersoid of the final product is distributed in or on the particles before consolidation or is formed in the resulting sheet after consolidation. This dispersoid, which preferably has a melting point in excess of 650° C., is in the geometrical form of substantially equiaxial grains, substantially biaxial platelets or substantially uniaxial whiskers, the minimum dimension of any of which is within the range of from about .003 to about 10 microns. In one form, these sub-particles, which characteristically are substantially insoluble in copper at the sintering temperatures specified above, are composed of a compound containing a metal or semi-metal such as Ca, Th, Mg, La, Be, Li, Y, Sr, Al, Hf, Ba, Ce, U, Zr, Ti, V, Si, Na, Mo, W, Ta, Cb, Mn, Cr, Zn, In, Mo, Sn, W, Fe, Cd, Co, Ni, Sb, Pb, Bi, Tl and Cu. The element with which this metal is combined, for example, is O, S, Se or Te from Group VI–A of the Periodic Table or B, C, N, Si or P from Groups II and III of the Periodic Table. Not all pairs of elements, one selected from the metal category and the other selected from the non-metal category consisting of Groups II, III and VI–A form compounds, e.g. Cu forms neither carbides nor nitrides. The foregoing therefore is intended to apply only to combinations which form compounds. Moreover, the important class of insoluble compounds, exemplified by the titanium silicides, $Ti_5Si_3$ and $TiSi_2$, may be formed from the first group. Generally, the optimum volume percent concentration of the compound sub-particles falls within the range of 0.01% to 15% by actual total solid volume of the combined matrix and dispersoid. In another form, the refractory metals Mo, W, and Ta, which appear to be essentially completely insoluble in solid copper, are excellent dispersoid strengthening particles.

PRODUCTION OF THE PARTICLE
OF FIG. 1

Generally, the irregular shape of the final particle of FIG. 1 is produced from a starting particle that is characterized by a sub-system therewithin, having physical and/or chemical characteristics from which sub-particles and/or large surface area may be generated. In one form, the sub-system contains oxygen, both in solution within the copper and in combination as $Cu_2O$. When hydrogen is diffused into this particle, the result depends on the temperature. At temperatures above about 300° F. but below 705° F., cavities with steam pressures up to the low level of about 3,000 p.s.i. form within the copper particle by the reaction of hydrogen with oxygen. However, at temperatures about 705° F., steam pressures of the order of 80,000 pounds per square inch are generated, in consequence of which the copper matrix is expanded and/or ruptured to form a very large surface area. Specifically, a suitable copper base particle, in one form, is made by comminuting, by well-known mechanical or hydraulic means, a molten copper-oxygen alloy, e.g. 99.5% copper—0.5% oxygen, by total weight. The resulting particle has a microstructure suggested in exaggerated detail in FIG. 1. Islands of primary crystallite 99.99% Cu—.01% oxygen, by total weight, are in a sea 12 of a eutectic mixture of copper sub-particles (open circles and containing less than 0.01% of oxygen by total weight) and of $Cu_2O$ sub-particles (black circles and containing 111.2% of oxygen by total weight). It is seen that the $Cu$—$Cu_2O$ eutectic is the matrix or continuous phase. Within the eutectic are the alternating submicron particles of Cu and $Cu_2O$. When a piece of copper containing $Cu_2O$ particles is heated in $H_2$, the latter diffuses into the solid Cu. Wherever the $H_2$ meets $Cu_2O$, it reduces it to Cu and $H_2O$. The latter is present entirely as steam vapor above 705° F. Until the surrounding copper structure yields, the steam vapor pressure is somewhat greater than 80,000 p.s.i. This pressure expands each cavity marking the site of a reduced $Cu_2O$ subparticle. Since these sites are more or less contiguous, many join to form extensive fissures.

The following non-limiting examples further illustrate the production of the particle shown in FIG. 1.

EXAMPLE I–A

Copper particles, having an apparent density of 4 to 5.5 are heated under hydrogen quickly between 700 and 900° C. for one quarter to one hour. The oxygen content of the particles is approximately 0.4 to 0.7 by total weight, being in the form of $Cu_2O$ distributed on the surface and in a eutectic network. The eutectic network along typically has 0.2 to 0.35% oxygen. The hydrogen treatment causes steam formation in the eutectic network and the resulting internal pressure causes fissuring throughout the eutectic network. The apparent volume of the powder increases approximately 20 to 50 percent and each particle has a rough and large fissured surface, as suggested in FIG. 1. Depending upon the heating time under hydrogen, which determines the distance into the copper to which the hydrogen diffuses, the oxygen content of the resulting powder is approximately 0.10 to 0.2% by total weight, a submicron-thick coating of which is on all surfaces exposed to air subsequent to the hydrogen treatment. The surface of the particles is sufficiently rough that the particles are adaptable for direct roll compacting to form a sheet. The rough surface and low oxygen content adapt these particles for direct roll compacting. The remaining subparticles of $Cu_2O$ distributed in these particles, in addition, are capable of dispersoid strengthening the final sheet; moreover and particularly, the sub-micron thick Cu oxide scale on the entire surface of the particle, including the interior fissure surfaces, gives superior dispersoid strengthening after roll compacting, which breaks up the scale into sub-micron-sized dispersoid strengthening particles.

EXAMPLE I–B

The process of Example I–A is repeated except that the heating time under hydrogen is such that the resulting apparent volume increases approximately to 100%. The resulting surface area is high and the oxygen content of the resulting powder is less than 0.03% by total weight. The rough surface and very low oxygen content adapt these particles for sheet formation by direct roll compacting. In order to achieve dispersion strengthening with $Cu_2O$ sub-particles, the heavily fissured powder is oxidized at temperatures below 400° C. to produce a sub-micron thick film of $Cu_2O$. During direct particle rolling, this film is fragmented into the dispersoid strengthening sub-particles.

EXAMPLE I–C

The process of Example I–B is repeated except that after heavily fissuring the particles under hydrogen, the particles are very quickly quenched in water. The resulting particles have a thin oxide coat and are somewhat brittle because of the deep fissuring. These particles are crushed mechanically so as to acquire a very rough surface characterized by large specific surface area. Optionally, these surfaces are reacted to form submicron thick skins of oxide, sulfide, boride, etc. for subsequent breakup during roll compacting into submicron-sized and spaced dispersoid strengthening particles. These particles are very suitable for high speed direct roll compacting by which the oxide, or other compound, skin is fragmented to provide dispersoid strengthening sub-particles.

PRODUCTION OF THE PARTICLES OF FIG. 2

Generally, the irregular shape of the particles of FIG. 2A is produced via a starting particle 16 that is form EO by comminuting a stream of molten copper, having a minor concentration of an active metal, by a gas or liquid stream. For best results, the melt contains one of the active metals listed above, such as aluminum, in a concentration by atomic percent ranging from 0.01 to 5.0, i.e. atoms of active metal per 100 atoms. In one form, these particles are subjected to a gaseous reagent such as oxygen which reacts with the active metal to produce a strong, tough, solid skin that prevents the particles, while still molten, from assuming a spherical shape. This skin is composed of a refractory compound from which refractory dispersoid sub-particles are formed when the particles are roll compacted in accordance with one process of the present invention. Alternatively, in accordance with another process of the present invention, following solidification, the skin optionally is removed by pickling with a suitable acid, and the particle is subjected to a reaction by which a refractory dispersoid forms within the particle. Alternatively, in accordance with a further process of the present invention, following solidification, the skin optionally is removed by pickling with a suitable acid, and reaction to form dispersoid particles is deferred until after the roll compacting described in connection with FIG. 4. FIG. 2B shows a modification of the FIG. 2A procedure to form non-spherical particles by the active metal solid skin technique. This is described in more detail in Example II–A.

The following non-limiting examples will further illustrate the production of the type of particle shown in FIG. 2A and 2B.

EXAMPLE II–A

A melt containing .2 atomic percent aluminum and remainder OF copper is placed in a 4½ O.D. crucible having ⅛" holes therethrough. With the melt at 300° F. superheat above 1981° F. (the melting point of copper), the crucible is spun at 1800 r.p.m. Molten streams are thereby extruded into the air and are drawn by centrifugal force into acicular particles; simultaneously, each particle becomes encased in a leathery $Al_2O_3$ skin and the acicular shape of the particle is thereby retained. The dimensions of the particle, the temperature of the molten streams and the quantity of air are such that substantially all of the aluminum in the particles is converted to $Al_2O_3$ capable of serving as a refractory dispersoid sub-particles when the particles are roll compacted.

EXAMPLE II–B

The process of Example II–A is repeated except that the aluminum content is increased to approximately 1.5 atomic percent and the particle dimensions, system temperature and oxygen concentration are such that not all of the aluminum in the particles is converted to $Al_2O_3$ at the particle surfaces but such that the $Al_2O_3$ skin that is formed at the particle surfaces retains the acicular particle shape. This $Al_2O_3$ skin is removed by pickling in hydrochloric acid. Thereafter the particles are subjected to a stream of air, optionally with reduced partial pressure of oxygen, at elevated temperature, by which internal oxidation of aluminum generates $Al_2O_3$ sub-particles within the acicular particles to be roll compacted.

EXAMPLE II-C

The process of Example II-B is repeated except that internal oxidation to form $Al_2O_3$ sub-particles within the acicular copper particles is omitted. The resulting acicular copper-aluminum alloy particles are available for roll compacting as will be described in connection with FIG. 4 to form a green sheet and formation of $Al_2O_3$ sub-particles by internal oxidation is effected after the green sheet is formed and either before or after sintering and further working.

PRODUCTION OF THE PARTICLE OF FIG. 3

Figure 3:
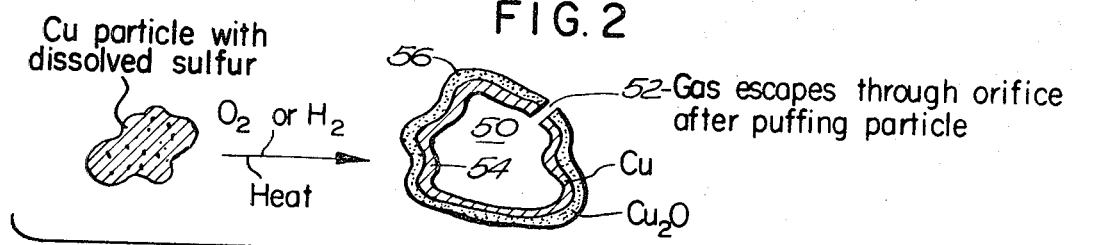
FIG. 3 illustrates, in exaggerated cross-section, details of the production of another alternative particulate intermediate product in accordance with the present invention.

Generally, the irregular shape of the particle of FIG. 3 is produced from a copper melt containing a concentration of sulfur ranging between 0.5 and 2.0% by total weight. This melt is atomized in a stream of reactive gas under appropriate conditions of air pressure, air-flow rate, orifice diameter and melt temperature in order to provide a specified reactive gas to sulfur ratio. While a particle is in its trajectory from an orifice, it undergoes an internal reaction by which sulfur combines with the reactive gas to produce an interior pressure causing puffing as at 50. The gaseous product escapes through naturally occurring holes as at 52 and leaves a copper shell as at 54. The exterior surface 56 of this shell may be reacted with a suitable agent to produce a refractory material from which sub-particles are produced when rolling is effected.

The following non-limiting examples further illustrate the production of the particle shown in FIG. 3.

EXAMPLE III-A

A melt of copper remainder and sulfur in a concentration of approximately 1.0% by total weight is heated in a crucible to a temperature of approximately 2000° F. The melt is atomized in a stream of air so that the oxygen from the air combines with sulfur in the resulting particle to form $SO_2$. The pressure exerted by the $SO_2$ leaves the particle hollow before escaping. The interior shell 54 thus formed is composed of copper and an exterior shell 56 composed of $Cu_2O$ is formed by reaction of this copper with oxygen.

EXAMPLE III-B

The process of Example III-A is repeated except that slightly wet hydrogen rather than the oxygen is selected as the reactive gas. Puffing is effected by the generation of $H_2S$. Thereafter heating the resulting powder in air at 950 to 1000° C. produces a coat of $Cu_2O$, which forms sub-particles when the powder is crushed mechanically to provide flakes. These flakes are suitable for rolling in accordance with the process of FIG. 4.

THE COMPACTING PROCESS OF FIG. 4

Figure 2:
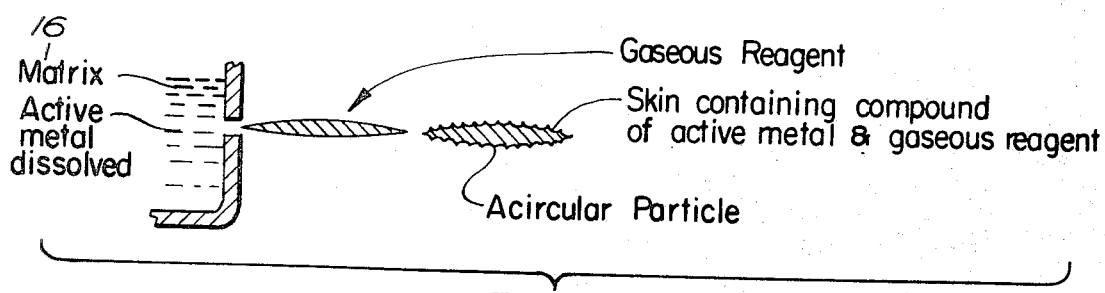
FIG. 2 illustrates, in exaggerated cross-section, details of the production of an alternative particulate intermediate product in accordance with the present invention.
Figure 4:
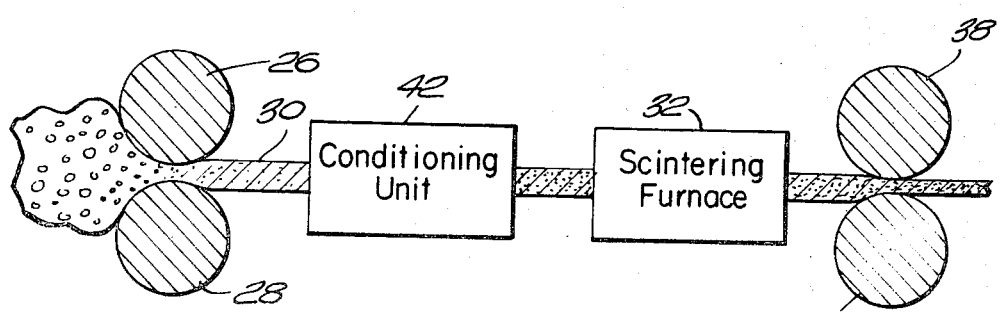
FIG. 4 illustrates particles of the type shown in FIGS. 1, 2 and 3 being processed in accordance with the present invention.

The process of FIG. 4 involves advancing a stream 24 of particles, of the type produced above in connection with FIGS. 1, 2 and 3, between a pair of compacting rolls 26, 28. Since the flow stress of copper is approximately 10,000 p.s.i. and since the surface configuration of the particles enhances their ability to lock with each other and in the nip of the rolls, the roll pressure range of 20,000 to 50,000 p.s.i. indicated above is capable of producing a green sheet at fairly high speed, for example, 100 to 700 feet per minute. Slower speeds can be of course be used if desired. Although compacting in the upper portion of the room temperature to 900° F. range tends to enable higher compacting speeds, temperatures in the lower portion of the range are adequately effective. Sintering green compact sheet 30 is effected, for example, in an in-line sintering furnace 32 at a temperature ranging from 600 to 1500° F. In the case of particles containing a refractory dispersoid as 34 in FIG. 1 and at 36 in FIG. 2, no further conditioning is needed before final working by reduction rolls 38, 40. In the case of particles containing a refractory material as at 56 in FIG. 3, sub-particles are formed by crushing either before or during roll compacting. In the case of particles containing only a component of a refractory dispersoid, as where an active metal in the copper matrix has not yet been reacted to form a refractory dispersoid, conditioning is achieved either in sintering oven 32 or in a conditioning unit 42 to form the refractory dispersoid. When finally worked by rolls 38, 40 to a final sheet, say 0.050 to 0.250 inch thick and an apparent density from 90 to 100% that of ordinary solid copper metal of the same composition, the refractory dispersoid particles are randomly dispersed in such a way as to serve a strengthening function.

The following non-limiting examples will further illustrate the process of FIG. 4.

EXAMPLE IV-A

A supply of particles produced as in Example I-C is passed at room temperature through the nip of a pair of rolls loaded with a pressure of 20,000 p.s.i. to produce a green compact sheet ¼ inch thick. This sheet, which initially is relatively weak but can be rolled into a coil, has a density of approximately 90–95% of theoretical. The strength and ductility are increased by sintering at 1200° F. for five hours. Finally, the sheet is reduced by cold working to a thickness of 0.1 inch, at which point the density approaches 100%. The final sheet product is dispersoid strengthened by $Cu_2O$ sub-particles so that it retains its strength to a temperature 200° F. higher than would a corresponding sheet product that is not dispersoid strengthened.

EXAMPLE IV-B

A supply of particles produced as in Example II-A and shown at 56 in FIG. 2 is passed at 500° F. through the nip of a pair of rolls loaded with a pressure of 25,000 p.s.i. to produce a green compact sheet ¼ inch thick. This sheet, which initially is relatively weak, has a density of approximately 80%. The strength and ductility are increased by sintering at 1200° F. for five hours. Finally, the sheet is reduced by cold working to a thickness of 0.2 inch, at which the density is almost 100%. The final sheet product is dispersoid strengthened by $Al_2O_3$ sub-particles so that it retains its strength to a temperature at least 500° F. higher than would a corresponding sheet product that is not dispersoid strengthened.

EXAMPLE IV-C

A supply of unoxidized particles produced as in Example III-A and shown in FIG. 3 is passed at room temperature through the nip of a pair of rolls loaded with a pressure of 25,000 p.s.i. to produce a green compact sheet ¼ inch thick. This sheet, which initially is relatively weak, has a density of approximately 60%. Finally, the sheet is reduced by cold working to a thickness of 0.2 inch and a density approaching 100%. The final sheet product is dispersoid strengthened.

EXAMPLE IV-D

A supply of so-called "cut wire" is selected in the form of Lake Copper particles of generally cylindrical shape. These particles are approximately 200 mesh and have lightly oxidized surfaces. The total oxygen content is approximately 0.25% by total weight. The supply is passed at room temperature through the nip of a pair of rolls loaded with a pressure of 25,000 p.s.i. to produce a green compact sheet ¼ inch thick. This sheet, which initially is relatively weak, has a density of approximately 90%. The green sheet is sintered at 1200° F. for five hours. Finally, the sheet is reduced by cold working to a thickness of 0.2 inch. The final sheet is dispersoid strengthened by $Cu_2O$.

EXAMPLE IV-E

Particles from Example IV-A, but with a relatively compound-free surface, are roll-compacted to a green sheet with considerable interconnecting porosity, e.g. 20–40% voids (corresponding to 80–40% of theoretical density) but with adequate green strength by virtue of the compound-free copper surfaces, which bond strongly together. By controlled time-temp-$O_2$ exposure, all pore and sheet surfaces are reacted to a sub-micron thick coating. Further rolling and annealing breaks the sub-micron coating up and incorporates it into the stable dispersoid strengthening particles.

EXAMPLE IV-F

Same as Example IV-E for particles containing an active metal in solution except that no surface compounds are formed until after the sheet is rolled to penultimate thickness not exceeding about .040. Internal oxidation is effected to form stable dispersoid strengthening particles, which are rolled to final thickness.

EXAMPLE IV-G

In Example IV-E, involving formation of a compound on the surface, by $O_2$ reaction, etc. on alternative procedure is to coat a suitable compound e.g. $SiO_2$, $TiO_2$, $Al_2O_3$, etc. by vapor deposition, drying on of a water solution of supension, and thereafter proceeding as indicated above.

CONCLUSION

The present invention thus provides for the production of intermediate copper metal particles that are particularly adapted for direct roll compacting and for the processing of copper metal particles in such a way as to produce dispersoid strengthened copper products by direct roll compacting. Since certain changes may be made in the foregoing products and processes without departing from the scope of the present invention, it is intended that all matter contained in the foregoing description and shown in the accompanying drawing be interpreted in an illustrative and not in a limiting sense.

What is claimed is:

1. A process for producing a continuous length of dispersoid strengthened sheet, said process comprising continuously feeding into the nip of a pair of pressure rolls a supply of irregularly shaped primary particles having fissures and a sufficiently irregular general surface configuration and sufficiently high specific surface area to result in an apparent particle density ranging from 3 to 5 grams per cubic centimeter, said primary particles consisting of at least 50% copper and at least a component of solid copper-insoluble secondary particles, said secondary particles being refractory, said pressure rolls applying pressure ranging from 20,000 pounds per square inch under temperatures ranging from room temperature to 900 F. in order to produce at said nip a green sheet containing said secondary particles as a dispersoid, said green sheet having an initial density by volume of from 60 to 95% of theoretical, and sintering at temperatures ranging from 600 to 1500° F. and further working said green sheet to produce a compact sheet having a density at least 95% that of theoretical, said compact sheet ranging in thickness from .0015 to 0.150 inch.

2. The process of claim 1 wherein said irregularly shaped primary particles are characterized by surface coatings composed at least of said component of said copper-insoluble secondary particles, said component being metallic.

3. The process of claim 1 wherein said copper-insoluble secondary particles consist of a copper refractory.

4. The process of claim 1 wherein said copper-insoluble secondary particles consist of copper oxide.

5. The process of claim 1 wherein said component of said copper-insoluble secondary particles is an active metal selected from the class consisting of Ca, Th, Mg, La, Be, Li, Y, Sr, Al, Hf, Ba, Ce, U, Zr, Ti, V, Si, Na, Mo, W, Ta, Cb, Mn, Cr, Zn, In, Sn, Fe, Cd, Co, Ni, Sb, Pb, Bi, and Tl.

6. The process of claim 1 wherein said component of said copper insoluble secondary particles is aluminum.

7. A process for producing a continuous length of dispersoid strengthened sheet, said process comprising subjecting primary particles composed of oxygen-containing copper at elevated temperatures ranging from 700 to 900° F. to hydrogen in order to cause a reaction between said oxygen and said hydrogen for the generation of steam by which fissuring in said primary particles occurs, said primary particles containing secondary particles insoluble in said copper, the resulting particles being characterized by a microstructure in which islands of primary crystallite are in a sea of eutectic mixture of said secondary particles, continuously feeding into the nip of a pair of pressure rolls a supply of said primary particles said pressure rolls applying pressure ranging from 20,000 to 50,000 pounds per square inch under temperature ranging from room temperature to 900° F., in order to produce at said nip a green sheet containing said secondary particles as a dispersoid, and sintering at temperatures ranging from 600 to 1500° F. and further working said green sheet to produce a compact sheet having a density of at least 95% that of theoretical, said compact sheet ranging in thickness from .0015 to 0.150 inch.

8. The process of claim 7 wherein said elevated temperature is in excess of 705° F.

9. The process of claim 8 wherein said secondary dispersoid particles are copper oxide.

10. A process for producing a continuous length of dispersoid strengthened sheet, said process comprising micro-shotting a melt at superheat above 1981° F., said melt containing copper as its characteristic ingredient and an active metal alloyed therewith to form primary particles of acicular or non-spherical configuration, said active metal constituting at least a component of secondary particles by which said sheet is dispersoid strengthened, said active metal being selected from the class consisting of Ca, Th, Mg, La, Be, Li, Y, Sr, Al, Hf, Ba, Ce, U, Zr, Ti, V, Si, Na, Mo, W, Ta, Cb, Mn, Cr, Zn, In, Sn, Fe, Cd, Co, Ni, Sb, Pb, Bi, and Tl, said microshotting producing a trajectory of molten particles into a space at a temperature below 1981° F., said active metal forming a skin by reaction with a nonmetallic gas at the surface of said primary particles by which said acicular or non-spherical configuration is maintained until solidification of said primary particles, continuously feeding into the nip of a pair of pressure rolls a supply of primary particles said pressure rolls applying pressure ranging from 20,000 to 50,00, pounds per square inch under temperatures ranging from room temperature to 900° F. to produce at said nip a green sheet, and sintering at 600 to 800° F. and further working said green sheet to produce a compact sheet having a density of at least 95% that of theoretical and having said secondary particles dispersed therein, said compact sheet ranging in thickness from .0015 to 0.150 inch.

11. The process of claim 10 wherein said secondary particles consist of the material of said skin.

12. The process of claim 11 wherein said secondary particles consist of an oxide.

13. The process of claim 10 wherein said secondary particles are produced by reaction of said active metal with an auxiliary gas before formation of said skin.

14. The process of claim 13 wherein said secondary particles consist of an oxide.

15. The process of claim 10 wherein said secondary particles are produced by reaction of said active metal with a non-metal after formation of said sheet.

16. The process of claim 15 wherein said secondary particles constitute an oxide.

References Cited
UNITED STATES PATENTS

| | | | |
|---|---|---|---|
| 3,069,759 | 12/1962 | Grant | 78—206 X |
| 3,070,440 | 12/1962 | Grant | 75—206 |
| 3,076,706 | 2/1963 | Daugherty | 75—206 X |
| 3,119,690 | 1/1964 | Wagner | 75—211 X |
| 3,139,682 | 7/1964 | Grant | 75—206 X |
| 3,176,386 | 4/1965 | Grant | 75—214 X |
| 3,250,838 | 5/1966 | Bartoszak | 75—214 X |
| 3,393,069 | 7/1968 | Gazzard | 75—214 X |
| 3,404,000 | 10/1968 | Raw | 75—214 |
| 3,407,063 | 10/1968 | Butcher | 75—212 |

CARL D. QUARFORTH, Primary Examiner

A. J. STEINER, Assistant Examiner

U.S. Cl. X.R.

29—420.5; 75—201, 206, 211, 213; 264—13